(12) United States Patent
Sueda et al.

(10) Patent No.: US 6,720,364 B2
(45) Date of Patent: Apr. 13, 2004

(54) ELASTOMERIC COMPOSITION FOR PREPARING OLEFINIC ELASTOMER CROSSLINKED FOAM AND USE THEREOF

(75) Inventors: Takanori Sueda, Ichihara (JP); Naoto Yasaka, Ichihara (JP); Chong-Sun Yoo, Pusan (KR); Jeong-Sik Yoon, Pusan (KR); Kyung-Man Choi, Pusan (KR)

(73) Assignee: Mitsui Chemicals, Inc., Tokyo (JP)

( * ) Notice: Subject to any disclaimer, the term of this patent is extended or adjusted under 35 U.S.C. 154(b) by 45 days.

(21) Appl. No.: 10/060,246

(22) Filed: Feb. 1, 2002

(65) Prior Publication Data

US 2002/0143077 A1 Oct. 3, 2002

(30) Foreign Application Priority Data

Feb. 1, 2001 (JP) ......................................... 2001-025918

(51) Int. Cl.$^7$ .................................................. C08J 9/00
(52) U.S. Cl. ..................... 521/96; 521/140; 521/134; 521/142; 521/144
(58) Field of Search ................................ 521/142, 144, 521/134, 96, 140

(56) References Cited

FOREIGN PATENT DOCUMENTS

| EP | 0 605 843 A1 | 7/1994 |
|----|----|----|
| EP | 0 997 493 A1 | 5/2000 |
| JP | 9-501447 | 2/1997 |
| JP | 11-206406 | 8/1999 |
| WO | WO 94/25515 | 11/1994 |
| WO | WO 97/48538 | 12/1997 |

OTHER PUBLICATIONS

Saret® *Acrylic Coagents*, Exton, PA, USA (copies of catalogs for the Sartomer Company).

*Primary Examiner*—Morton Foelak
(74) *Attorney, Agent, or Firm*—Birch, Stewart, Kolasch & Birch, LLP

(57) ABSTRACT

The elastomeric composition for preparing an olefinic elastomer crosslinked foam according to the present invention contains an ethylene/α-olefin copolymer (A) having a specific density and MFR, an organic peroxide (D), a crosslinking assistant (E), a foaming agent (F), an organic metal compound (G), and as necessary, a high pressure low density polyethylene (B) having a specific MFR, and an ethylene/vinyl acetate copolymer (C) having a specific amount of vinyl acetate and a specific MFR. An olefinic elastomer crosslinked foam of the present invention can be obtained by crosslinking and foaming the above composition. Further, another olefinic elastomer crosslinked foam of the present invention can be obtained by a secondary compression of the above crosslinked foam. The footwear part of the present invention is made of these crosslinked foams. The present invention provides an elastomeric composition for preparing an olefinic elastomer crosslinked foam that can provide an olefinic elastomer crosslinked foam having an Asker C hardness of 20 to 80, a low specific gravity, a low compression set, and excellent tear strength and impact resilience; and a crosslinked foam made of this. Furthermore, the present invention provides footwear parts made of the above crosslinked foam.

30 Claims, No Drawings

ELASTOMERIC COMPOSITION FOR PREPARING OLEFINIC ELASTOMER CROSSLINKED FOAM AND USE THEREOF

BACKGROUND OF THE INVENTION

1. Field of the Invention

The present invention relates to an elastomeric composition for preparing an olefinic elastomer crosslinked foam and use thereof, and more specifically, an elastomeric composition for preparing an olefinic elastomer crosslinked foam that can provide an olefinic elastomer crosslinked foam having an Asker C hardness of 20 to 80, a low specific gravity, a low compression set (CS), and an excellent tear strength and impact resilience, and to an olefinic elastomer crosslinked foam made of this.

2. Description of the Related Art

Techniques using crosslinked foams to obtain a resin having a low specific gravity, i.e. a light weight, a high flexibility and a high mechanical strength are broadly applied to interior and exterior building materials, automotive parts such as interior materials or door glass runs, wrapping materials, articles of daily use, etc. Such techniques are used because mere foaming a resin for weight reduction leads to a reduction of mechanical strength, but, in contrast, binding molecular chains by crosslinking reaction of a resin enables weight reduction by foaming while avoiding reduction of mechanical strength.

In addition, resin crosslinked foams are also used for soles (mainly, midsoles) of athletic shoes etc. This is because materials are needed that are light and have a high mechanical strength enough to avoid deformation due to long-term use and withstand harsh use conditions.

Conventionally, crosslinked foams of an ethylene/vinyl acetate copolymer are used for soles and is publicly known. However, such crosslinked foams, which are molded using an ethylene/vinyl acetate copolymer composition, have a high specific gravity and are insufficient in terms of a low compression set, and therefore when used for a sole for example, a problem arises that the sole is heavy and is compressed by long-term use, so that mechanical strength such as impact resilience is lost.

National Publication of International Patent Application No. 9-501447 and Japanese Patent Laid-Open No. 11-206406 describe a crosslinked foam using an ethylene/α-olefin copolymer, and a crosslinked foam using a mixture of an ethylene/vinyl acetate copolymer and an ethylene/α-olefin copolymer, respectively. Some improvements in terms of a low specific gravity and a low compression set are attained, but adequate performance has not been obtained in these inventions.

Therefore, there is a need for an elastomeric composition for preparing an olefinic elastomer crosslinked foam that can provide an olefinic elastomer crosslinked foam having an Asker C hardness of 20 to 80, a low specific gravity, a low compression set (CS) and an excellent tear strength and impact resilience, and a crosslinked foam made of this.

The present invention intends to solve the above problems accompanying the prior art, and an object of the present invention is to provide an elastomeric composition for preparing an olefinic elastomer crosslinked foam that can provide an olefinic elastomer crosslinked foam having an Asker C hardness of 20 to 80, a low specific gravity and a low compression set (CS) and furthermore having excellent tear strength and impact resilience, and a crosslinked foam made of this.

Another object of the present invention is to provide a footwear part made of the above olefinic elastomer crosslinked foam, such as a sandals and a sole, midsole, and innersole of shoes.

SUMMARY OF THE INVENTION

The elastomeric composition for preparing an olefinic elastomer crosslinked foam of the present invention comprises an ethylene/α-olefin copolymer (A) having a density (ASTM D 1505) of 880 to 920 kg/m$^3$, and a melt flow rate (ASTM D 1238, 190° C., 2.16 kg load), MFR$_{2.16}$, of 0.1 to 10 g/10 min; an organic peroxide (D); a crosslinking assistant (E); a foaming agent (F); and an organic metal compound (G) which is a compound of metal selected from Groups 2 to 12 of the periodic table and having at least two groups containing unsaturated carbon bond and at least one atom selected from oxygen, sulfur and nitrogen per one molecule.

This elastomeric composition may further comprise, based on 100 parts by weight of the ethylene/α-olefin copolymer (A), 5 to 100 parts by weight of a high pressure low density polyethylene (B) having a melt flow rate (ASTM D 1238, 190° C., 2.16 kg load) of 0.1 to 50 g/10 min, and/or 5 to 1,900 parts by weight of an ethylene/vinyl acetate copolymer (C) having a vinyl acetate content of 10 to 30% by weight and a melt flow rate (ASTM D 1238, 190° C., 2.16 kg load) of 0.1 to 50 g/10 min.

The α-olefin in the above ethylene/α-olefin copolymer (A) is usually an α-olefin having 3 to 10 carbon atoms.

There may be used, as the above ethylene/α-olefin copolymer (A), a mixture of two or more ethylene/α-olefin copolymers having a molecular weight distribution (Mw/Mn) determined by gel permeation chromatography (GPC) of 1.5 to 4, and a ratio (MFR$_{10}$/MFR$_{2.16}$) of a melt flow rate (ASTM D 1238, 190° C., 2.16 kg load), MFR$_{2.16}$ to a melt flow rate (ASTM D 1238, 190° C., 10 kg load), MFR$_{10}$, of 5 to 20.

The above mixture of two or more of the ethylene/α-olefin copolymers is preferably produced by blending or multistage polymerization so that the molecular weight distribution (Mw/Mn) determined by GPC can be within a range of 2.3 to 6.

The above organic metal compound (G) generally has at least two $CH_2=CH-CO-$ or $CH_2=C(CH_3)-CO-O-$ groups per molecule.

The above organic metal compound (G) is preferably an organic zinc compound.

The organic zinc compound is preferably zinc diacrylate or zinc dimethacrylate.

The above organic metal compound (G) is contained in the above elastomeric composition in a proportion of 0.05 to 5 parts by weight based on 100 parts by weight of the total amount of the ethylene/α-olefin copolymer (A), the high pressure low density polyethylene (B) and the ethylene/vinyl acetate copolymer (C). However, since components (B) and (C) are optional components, the amount of these components may be 0 part by weight.

The olefinic elastomer crosslinked foam of the present invention is obtained by crosslinking and foaming the above elastomeric composition for preparing an olefinic elastomer crosslinked foam of the present invention.

The olefinic elastomer crosslinked foam of the present invention may be a crosslinked foam obtained by a secondary compression of the crosslinked foam of the present invention.

The secondary compression is usually performed under conditions of a temperature of 130° C. to 200° C., a load of 30 to 300 kgf/cm$^2$ for 5 to 60 minutes.

These crosslinked foams desirably have a specific gravity (JIS K7222 (g/cm$^3$)) of 0.05 to 0.25, a surface hardness (Asker C hardness) of 20 to 80, and a gel fraction of 70% or more.

The footwear part of the present invention is made of the above olefinic elastomer crosslinked foam of the present invention.

Examples of the footwear parts include midsoles, innersoles, soles, etc.

DETAILED DESCRIPTION OF THE PREFERRED EMBODIMENTS

Now, the elastomeric composition for preparing an olefinic elastomer crosslinked foam of the present invention and a use thereof are described in detail.

The elastomeric composition for preparing an olefinic elastomer crosslinked foam of the present invention is an uncrosslinked unfoamed composition which is to be crosslinked and foamed by heating, and it comprises an ethylene/α-olefin copolymer (A), an organic peroxide (D), a crosslinking assistant (E), a foaming agent (F), an organic metal compound (G), and as necessary, a high pressure low density polyethylene (B) and an ethylene/vinyl acetate copolymer (C).

Ethylene/α-olefin Copolymer (A)

Ethylene/α-olefin copolymer (A) used in the present invention is a low crystalline random copolymer composed of ethylene and an α-olefin containing 3 to 10 carbon atoms, and has a density (ASTM D 1505) of 880 to 920 kg/m$^3$ and a melt flow rate (ASTM D 1238, 190° C., 2.16 kg load), MFR$_{2.16}$, of 0.1 to 10 g/10 min, preferably 0.5 to 10 g/10 min, and more preferably 0.5 to 5 g/10 min.

Moreover, the molecular weight distribution (Mw/Mn) of ethylene/α-olefin copolymer (A) determined by gel permeation chromatography (GPC) is preferably within a range of 1.5 to 4. By using an ethylene/α-olefin copolymer (A) having a molecular weight distribution (Mw/Mn) within the above range, a composition which is capable for giving an elastomer crosslinked foam excellent in terms of high mechanical strength and low compression set can be obtained.

The above molecular weight distribution (Mw/Mn) was determined using GPC-150C (Millipore) as follows.

As a separation column, TSK GNH HT having a diameter of 72 mm and a length of 600 mm was used, the column temperature was set at 140° C., and o-dichlorobenzene (Wako Pure Chemical Industries, Ltd.) and 0.025% by weight BHT (Takeda Chemical Industries, Ltd.) as an antioxidant were of used as a mobile phase. 500 μl of the sample having a concentration of 0.1% by weight, was poured into the column and transferred by the mobile phase fed at a rate of 1.0 ml/min. A differential refractometer was used as a detector. Using an EPR having a known Mw and Mn as a standard sample, the molecular weight was determined.

The α-olefin to be copolymerized with ethylene is preferably an α-olefin having 3 to 10 carbon atoms, and examples of such α-olefins include propylene, 1-butene, 1-pentene, 1-hexene, 1-heptene, 1-octene, 1-nonene, 1-decene, 4-methyl-1-pentene, etc., and of these, propylene, 1-butene, 1-hexene, 4-methyl-1-pentene and 1-octene are particularly preferable. These α-olefins are used singly or in combination of two or more.

The ethylene/α-olefin copolymer (A) contains a unit derived from ethylene at an amount of usually 85 to 99 mole %, preferably 85 to 98 mole %, and a unit derived from an α-olefin (preferably, those having 3 to 10 carbon atoms) at an amount of usually 1 to 15 mole %, preferably 2 to 15 mole %.

The composition of the ethylene/α-olefin copolymer (A) is generally determined by measuring $^{13}$C-NMR spectrum of the sample obtained by homogenously dissolving about 200 mg of the ethylene/α-olefin copolymer in 1 ml of hexachlorobutadiene in a 10 mm φ sample tube under conditions of a temperature of 120° C., a frequency of 25.05 MHz, a spectrum width of 1,500 Hz, a pulse-repetition time of 4.2 sec, and a pulse width of 6 μsec.

In addition to the above units, the ethylene/α-olefin copolymer (A) may contain units derived from other polymerizable monomers to the extent that they do not impair the objects of the present invention.

Examples of preferable ethylene/α-olefin copolymers (A) include an ethylene/propylene random copolymer, an ethylene/1-butene random copolymer, an ethylene/propylene/1-butene random copolymer, an ethylene/1-hexene random copolymer, an ethylene/4-methyl-1-pentene random copolymer, an ethylene/1-octene random copolymer, etc. These copolymers may be used in combination of two or more.

As for the flow properties of the ethylene/α-olefin copolymer (A) used in the present invention, the ratio (MFR$_{10}$/MFR$_{2.16}$) of a melt flow rate (ASTM D 1238, 190° C., 2.16 kg load), MFR$_{2.16}$, to a melt flow rate (ASTM D 1238, 190° C., 10 kg load), MFR$_{10}$, is preferably within a range of 5 to 20.

Furthermore, as the ethylene/α-olefin copolymer (A), two or more ethylene/α-olefin copolymers having different composition and molecular weight can also be used in combination. For example, the following composition is preferably used, that is, one comprising: 5 to 95 parts by weight of an ethylene/α-olefin copolymer (A-1) having a density (ASTM D 1505) of 880 kg/m$^3$ to less than 900 kg/m$^3$, a melt flow rate (ASTM D 1238, 190° C., 2.16 kg load) of 0.1 to 50 g/10 min, and a molecular weight distribution (Mw/Mn) determined by GPC of 1.5 to 4; and 5 to 95 parts by weight of an ethylene/α-olefin copolymer (A-2) having a density (ASTM D 1505) of 900 to 920 kg/m$^3$, a melt flow rate (ASTM D 1238, 190° C., 2.16 kg load) of 0.1 to 50 g/10 min, and a molecular weight distribution (Mw/Mn) determined by GPC of 1.5 to 4 (the total amount of both copolymers is 100 parts by weight). Two or more types of these copolymers (A-1) and (A-2) can also be used.

The molecular weight distribution (Mw/Mn) of the above mixture of two or more of the ethylene/α-olefin copolymers determined by GPC is preferably within a range of 2.3 to 6.

The above ethylene/α-olefin copolymer (A) can be produced by a previously known method involving the use of a vanadium, titanium or metallocene catalyst.

To obtain a composition composed of component (A-1) and component (A-2), either a method of blending these components or a method of polymerizing different compositions by multistage polymerization may be selected.

High pressure low density polyethylene (B)

High pressure low density polyethylene (B) that is optionally used in the present invention, is a polyethylene resin produced by radical polymerization of ethylene or both ethylene and an α-olefin having 3 to 10 carbon atoms, using a publicly known tubular reactor or an autoclave reactor, in the presence of a radical polymerization catalyst under high pressure.

The α-olefin to be copolymerized with ethylene is an α-olefin having 3 to 10 carbon atoms, and examples of such α-olefins include propylene, 1-butene, 1-pentene, 1-hexene, 1-heptene, 1-octene, 1-nonene, 1-decene, 4-methyl-1-pentene, etc., and of these, propylene, 1-butene, 1-hexene, 4-methyl-1-pentene and 1-octene are preferable. These α-olefins are used singly or in combination of two or more.

The high pressure low density polyethylene (B) may contain units derived from an α-olefin having 3 to 10 carbon atoms at an amount of less than 1 mole %.

The composition of the high pressure low density polyethylene (B) is determined by the same measurement method as for the composition of the ethylene/α-olefin copolymer (A) stated above.

The density (ASTMD 1505) of the high pressure low density polyethylene (B) is usually 910 to 930 kg/m$^3$, preferably 915 to 930 kg/m$^3$, and more preferably 915 to 925 kg/m$^3$.

The melt flow rate (MFR; ASTM D 1238, 190° C., 2.16 kg load) of the high pressure low density polyethylene (B) is within a range of 0.1 to 50 g/10 min, preferably 0.5 to 20 g/10 min, and more preferably 0.5 to 10 g/10 min. When the melt flow rate is within the above range, a composition with excellent moldability, which can provide a high strength crosslinked foam, can be obtained.

The high pressure low density polyethylene (B) is used, as necessary, in a proportion of 5 to 100 parts by weight, preferably 10 to 70 parts by weight, and more preferably 15 to 45 parts by weight based on 100 parts by weight of the ethylene/α-olefin copolymer (A). When the high pressure low density polyethylene (B) is used in the above proportion, an elastomeric composition that can provide crosslinked foam having high strength and excellent tear strength can be obtained.

Ethylene/vinyl acetate copolymer (C)

The ethylene/vinyl acetate copolymer (C), that is optionally used in the present invention, is obtained by copolymerization of ethylene and vinyl acetate.

The ethylene/vinyl acetate copolymer (C) contains 10 to 30% by weight, preferably 15 to 30% by weight, and more preferably 15 to 25% by weight of vinyl acetate unit.

The melt flow rate (MFR; ASTM D 1238, 190° C., 2.16 kg load) of the ethylene/vinyl acetate copolymer (C) is within a range of 0.1 to 50 g/10 min, preferably 0.5 to 20 g/10 min, and more preferably 0.5 to 10 g/10 min.

The ethylene/vinyl acetate copolymer (C) is used, as necessary, in a proportion of more than 0 part by weight to 1,900 parts by weight, preferably 5 to 1,900 parts by weight, based on 100 parts by weight of the ethylene/α-olefin copolymer (A). When the ethylene/vinyl acetate copolymer (C) is used in the above proportion, an elastomeric composition that can provide a crosslinked foam having excellent tear strength can be obtained.

Organic Peroxide (D)

Examples of organic peroxides (D) used as a crosslinking agent in the present invention include dicumyl peroxide, di-t-butyl peroxide, 2,5-dimethyl-2,5-di-(t-butyl peroxy) hexane, 2,5-dimethyl-2,5-di-(t-butyl peroxy)hexyne-3, 1,3-bis (t-butyl peroxy isopropyl)benzene, 1,1-bis(t-butyl peroxy)-3,3,5-trimethylcyclohexane, n-butyl-4,4-bis (t-butyl peroxy)valerate, benzoyl peroxide, p-chlorobenzoyl peroxide, 2,4-dichlorobenzoyl peroxide, t-butyl peroxy benzoate, t-butyl perbenzoate, t-butyl peroxy isopropyl carbonate, diacetyl peroxide, lauroyl peroxide, t-butyl cumyl peroxide, etc.

In the present invention, the organic peroxide (D) is used in a proportion of usually 0.1 to 1.5 parts by weight, preferably 0.2 to 1.0 parts by weight, based on 100 parts by weight of the total amount of the ethylene/α-olefin copolymer (A), the high pressure low density polyethylene (B) and the ethylene/vinyl acetate copolymer (C). When the organic peroxide (D) is used in the above proportion together with a crosslinking assistant (E), a crosslinked foam having an appropriate crosslinked structure can be obtained.

Crosslinking Assistant (E)

Examples of crosslinking assistants (E) used in the present invention include peroxy crosslinking assistants such as sulfur, p-quinone dioxime, p,p'-dibenzoyl quinone dioxime, N-methyl-N-4-dinitrosoaniline, nitrosobenzene, diphenylguanidine and trimethylolpropane-N,N'-m-phenylenedimaleimide, divinylbenzene, triallyl cyanurate (TAC) and triallyl isocyanurate (TAIC). Moreover, the examples also include multifunctional methacrylate monomers such as ethylene glycol dimethacrylate, diethylene glycol dimethacrylate, polyethylene glycol dimethacrylate, trimethylolpropane trimethacrylate and allyl methacrylate, and multifunctional vinyl monomers such as vinyl butylate and vinyl stearate. Of these, triallyl cyanurate (TAC) and triallyl isocyanurate (TAIC) are preferable.

In the present invention, the crosslinking assistant (E) as stated above is desirably used in an amount where the weight ratio [(E)/(D)] of the crosslinking assistant (E) to the organic peroxide (D) is 1/30 to 5/1, preferably 1/20 to 3/1, and more preferably 1/15 to 2/1.

Foaming Agent (F)

Examples of foaming agents (F) used in the present invention include organic pyrolytic foaming agents such as azodicarbonamide (ADCA), N,N'-dinitrosopentamethylenetetramine, 4,4'-oxybis (benzenesulfonyl hydrazide), diphenylsulfone-3,3'-disulfonyl hydrazide, p-toluenesulfonyl semicarbazide and trihydrazinotriazine, and inorganic pyrolytic foaming agents such as sodium hydrogen carbonate, sodium carbonate, ammonium hydrogen carbonate and ammonium carbonate. Of these, azodicarbonamide (ADCA) and sodium hydrogen carbonate are particularly preferable.

The foaming agent (F) is used in the present invention in a proportion of usually 3 to 20 parts by weight, preferably 5 to 15 parts by weight, based on 100 parts by weight of the total amount of the ethylene/α-olefin copolymer (A), the high pressure low density polyethylene (B) and the ethylene/vinyl acetate copolymer (C). When the foaming agent (F) is used in the above proportion, a foamed product having a high expansion ratio and a closed cell ratio can be obtained. The amount of the foaming agent (F) is determined considering the expansion ratio of the crosslinked foam.

Organic Metal Compound (G)

The organic metal compound (G) used in the present invention has, per one molecule, at least two groups containing unsaturated carbon bond and at least one atom selected from oxygen, sulfur and nitrogen.

The organic metal compound (G) is a compound of metal selected from Groups 2 to 12 of the periodic table. Among them, metals of Groups 3 to 12 are classified into transition metal. That is, compounds of metals of Groups 3 to 12 are organic transition metal compounds. In the present invention, preferred metals are Groups 2 and 12, more preferred are Mg and Zn, and particularly preferred is Zn.

The group containing unsaturated carbon bond and at least one atom selected from oxygen, sulfur and nitrogen is preferably a group having a structure wherein oxygen atom, sulfur atom or nitrogen atom is directly bonded to the metal atom, more preferably unsaturated aliphatic carboxyl group, and particularly $CH_2=CH-CO-O-$ and $CH_2=C(CH_3)-CO-O-$.

The organic metal compound (G) used in the present invention has at least two $CH_2=CH-CO-O-$ or $CH_2=C(CH_3)-CO-O-$ groups per molecule, and a zinc compound is preferably used as an organic metal compound. Specifically, zinc diacrylate (ZDA) or zinc dimethacrylate (ZDMA) represented by the respective formulas shown below is preferable:

$(CH_2=CH-CO-O-)_2Zn$ $(CH_2=C(CH_3)-CO-O-)_2Zn$

ZDA may simply be called "zinc acrylate". Similarly, ZDMA may simply be called "zinc methacrylate".

The organic metal compounds (G) include those formed in composition by a reaction during melt-extrusion of, for example, metal oxide such as zinc oxide and organic compound such as acrylic acid and methacrylic acid together with the aforementioned components (A) to (F).

The above organic metal compound (G) is used in a proportion of usually 0.05 to 5 parts by weight, preferably 0.05 to 4 parts by weight, more preferably 0.1 to 2 parts by weight, based on 100 parts by weight of the total amount of the ethylene/α-olefin copolymer (A), the high pressure low density polyethylene (B) and the ethylene/vinyl acetate copolymer (C). When the organic metal compound (G) is used in the above proportion, foaming cells become more fine and homogeneous since the gel fraction in the obtained crosslinked foam increases. As a result, mechanical properties of the crosslinked foam such as compression set, tear strength and impact resilience are enhanced.

Olefinic elastomer crosslinked foam

The olefinic elastomer crosslinked foam of the present invention can be obtained by crosslinking and foaming the above-stated elastomeric composition for preparing an olefinic elastomer crosslinked foam of the present invention, which is usually performed under conditions of a temperature of 130° C. to 200° C. and a load of 30 to 300 kgf/cm² for 10 to 90 minutes. However, the time period of the crossing and foaming can be altered appropriately beyond the above-defined range, depending on the thickness of a mold.

Moreover, the olefinic elastomer crosslinked foam of the present invention may be a crosslinked foam obtained by compression molding of the formed article obtained by crosslinking and foaming under the above conditions, under the following conditions: a temperature of 130° C. to 200° C., a loading of 30 to 300 kgf/cm², and a compression ratio of 1.1 to 3, preferably 1.3 to 2 for 5 to 60 minutes.

These crosslinked foams have a specific gravity (JIS K 7222) of 0.05 to 0.25, a surface hardness (Asker C hardness; JIS S 6050) of 20 to 80, and a gel fraction of 70% or more, usually 80 to 99%.

The olefinic elastomer crosslinked foam of the present invention having the above properties has a low compression set, high tear strength and high impact resilience.

The gel fraction (gel content=xylene-insoluble fraction) is determined as follows:

An olefinic elastomer crosslinked foam sample was weighed and cut into small pieces, and then the obtained pieces and xylene were placed into a closed container and refluxed for 3 hours.

Subsequently, the sample was placed on a filter for absolute drying. The weight of the dried residue minus the weight of xylene-insoluble components (e.g. a filler, a bulking agent, a pigment, etc.) other than polymeric components is defined as "corrected final weight (Y)".

The weight of the sample minus both the weight of xylene-soluble components (e.g. a stabilizer etc.) other than polymeric components and the weight of xylene-insoluble components (e.g. a filler, a bulking agent, a pigment, etc.) other than polymeric components is defined as "corrected initial weight (X)".

Now, gel content (xylene-insoluble fraction) is determined by the following formula:

Gel fraction [% by weight]=[corrected final weight (Y)]divided by [corrected initial weight (X)]×100

Preparation of Olefinic Elastomer Crosslinked Foam

The olefinic elastomer crosslinked foam of the present invention can be prepared, for an example, by the following method.

The above-stated various components of the elastomeric composition for preparing an olefinic elastomer crosslinked foam of the present invention are mixed with a Henschel mixer, and the obtained mixture is then subjected to melt mixing with a Banbury mixer, a roll or an extruder. In this melt mixing process, the mixture should be mixed and kneaded under the decomposition temperature of the foaming agent (F) and the organic peroxide (D) as a crosslinking agent. More specifically, the mixture should be mixed and kneaded under a condition where the temperature of the composition in a molten state is set at 100° C. to 140° C., so that the composition becomes homogeneous.

In addition to the above-described ethylene/α-olefin copolymer (A), high pressure low density polyethylene (B), ethylene/vinyl acetate copolymer (C), organic peroxide (D), crosslinking assistant (E), foaming agent (F) and organic metal compound (G), the composition of the present invention may optionally include fillers such as talc, calcium carbonate, aluminum hydroxide and magnesium hydroxide, or various additives such as a heat stabilizer, a weathering stabilizer, a flame retardant, an absorbent for hydrochloric acid, a pigment, a lubricant and a slip agent to the extent that they do not impair the object of the present invention.

A sheet of the elastomeric composition for preparing an olefinic elastomer crosslinked foam of the present invention can be obtained, for example, sheeting mixture obtained by the above mixing and kneading process by a calendaring machine, a pressing machine or T-die extruder. In this sheet forming process, the mixture should be sheet formed under the decomposition temperature of foaming agent (F) and organic peroxide (D). More specifically, the mixture should be sheet formed under a condition where the temperature of the composition in a molten state is set at 100° C. to 140° C.

The sheeted composition obtained by the above sheet forming process is cut to size within a ratio range of 1.0 to 1.2 time based on the capacity of a mold kept at a temperature of 130° C. to 200° C., and then the piece is inserted into the mold. The primary crosslinked foam is prepared by process comprising melting the composition under conditions of a clamping pressure of 30 to 300 kgf/cm² and a retention time of 10 to 90 minutes, performing crosslinking reaction and decomposition of foaming agent, and opening the mold to foam the composition.

The form of the above mold used for forming the crosslinked foaming is not particularly limited, but generally a mold having a form from which a sheet can be obtained is used. This mold used for forming the crosslinked foaming should have a fully closed structure so that molten resin and gases generated by decomposition of the foaming agent do not escape. Moreover, a retaining mold preferably has a taper inside for release of the resin from the mold.

The primary crosslinked foam obtained by the above method is then formed to a predetermined shape by compression molding. The conditions for this compression molding are: a mold temperature of 130° C. to 200° C., a clamping pressure of 30 to 300 kgf/cm², a compression time of 5 to 60 minutes, and a compression ratio within a range of 1.1 to 3.0.

Footwear Parts

The footwear parts of the present invention is made of the olefinic elastomer crosslinked foam of the present invention described above.

Examples of the footwear parts include sandals and the soles, midsoles, and innersoles of shoes.

EFFECT OF THE INVENTION

The present invention provides an elastomeric composition for preparing an olefinic elastomer crosslinked foam that can provide an olefinic elastomer crosslinked foam having an Asker C hardness of 20 to 80, a low specific gravity, a low compression set (CS), an excellent tear strength and impact resilience, and crosslinked foam made of this.

Moreover, the present invention provides footwear parts made of the above olefinic elastomer crosslinked foam, e.g. sandals, and soles, midsoles, and innersoles of shoes.

EXAMPLES

The present invention will be further described in the following examples. The examples are provided for illustrative purposes only, and are not intended to limit the scope of the invention.

For each of the crosslinked foams obtained in the Examples and Comparative examples, specific gravity, compression set, tear strength, Asker C hardness (surface hardness) and impact resilience were determined by the following method. Moreover, the gel fraction (gel content) was determined by the above-stated method.

(1) Specific Gravity

Specific gravity was determined according to JIS K 7222.

(2) Compression Set

A compression set test was carried out under conditions of 50° C.×6 hrs and a compression amount of 50% to determine compression set (CS), in accordance with JIS K 6301.

(3) Tear Strength

A tear strength test was carried out at a pulling rate of 100 mm/min to determine tear strength, in accordance with BS5131-2.6.

(4) Asker C Hardness

Asker C hardness was determined according to "Method for carrying out a spring hardness test (type C test)" described in attachment 2 of JIS K7312-1996.

(5) Impact Resilience

Impact resilience was determined according to JIS K6255.

Ethylene/α-olefin copolymers used in the Examples and Comparative examples are as follows:

(1) Ethylene/1-butene Copolymer (A1)

MFR (ASTM D 1238, 190° C., 2.16 kg load)=0.5 g/10 min

Density (ASTM D 1505)=885 kg/m³

Mw/Mn=2.0

$MFR_{10}/MFR_{2.16}$=6.0

(2) Ethylene/1-butene Copolymer (A2)

MFR (ASTM D 1238, 190° C., 2.16 kg load)=0.5 g/10 min

Density (ASTM D 1505)=885 kg/m³

Mw/Mn=2.1

$MFR_{10}/MFR_{2.16}$=10.4

(3) Ethylene/1-butene Copolymer (A3)

MFR (ASTM D 1238, 190° C., 2.16 kg load)=3.6 g/10 min

Density (ASTM D 1505)=895 kg/m³

Mw/Mn=2.1

$MFR_{10}/MFR_{2.16}$=5.7

(4) Ethylene/1-butene Copolymer (A4)

MFR (ASTM D 1238, 190° C., 2.16 kg load)=3.6 g/10 min

Density (ASTM D 1505)=895 kg/m³

Mw/Mn=2.0

$MFR_{10}/MFR_{2.16}$=8.3

(5) Ethylene/1-butene Copolymer (A5)

MFR (ASTM D 1238, 190° C., 2.16 kg load)=1.2 g/10 min

Density (ASTM D 1505)=905 kg/m³

Mw/Mn=2.1

$MFR_{10}/MFR_{2.16}$=5.9

(6) Ethylene/1-hexene Copolymer (A6)

MFR (ASTM D 1238, 190° C., 2.16 kg load)=1.3 g/10 min

Density (ASTM D 1505)=905 kg/m³

Mw/Mn=3.0

$MFR_{10}/MFR_{2.16}$=6.5

Example 1

25 parts by weight of the above ethylene/1-butene copolymer (A1), 45 parts by weight of the above ethylene/1-butene copolymer (A3), 30 parts by weight of the above ethylene/1-hexene copolymer (A6), 3 parts by weight of zinc oxide, 1 part by weight of stearic acid, 4 parts by weight of titanium white, 0.6 parts by weight of dicumyl peroxide, 0.15 parts by weight of triallyl cyanurate, 7.0 parts by weight of azodicarbonamide and 0.4 parts by weight of zinc acrylate were mixed and kneaded for 10 minutes with twin rolls having a roll surface temperature of 120° C., and the mixture was then molded into a sheet shape.

After being filled in a press mold, the obtained sheet was pressurized and heated under conditions of 150 kg/cm², 155° C. and 30 minutes to obtain the primary crosslinked foam. The size of the press mold was 15 mm in thickness, 150 mm in length and 200 mm in width.

Then, the primary crosslinked foam was compression molded under conditions of 155° C., 150 kg/cm² and 10 minutes to obtain the secondary crosslinked foam. The size of the thus obtained secondary crosslinked foam was 15 mm in thickness, 160 mm in length and 250 mm in width.

Subsequently, the specific gravity, compression set, tear strength, Asker C hardness, impact resilience and gel fraction of the secondary crosslinked foam were determined according to the above-described methods. The results are shown in Table 1.

Example 2

Example 2 was carried out according to the same method as Example 1 with the exception that 25 parts by weight of ethylene/1-butene copolymer (A2) was used instead of 25 parts by weight of ethylene/1-butene copolymer (A1) and that 45 parts by weight of ethylene/1-butene copolymer (A4) was used instead of 45 parts by weight of ethylene/1-butene copolymer (A3) The results are shown in Table 1.

Then, the primary crosslinked foam was compression molded under conditions of 155° C., 150 kg/cm$^2$ and 10 minutes to obtain the secondary crosslinked foam. The size of the thus obtained secondary crosslinked foam was 15 mm in thickness, 160 mm in length and 250 mm in width.

Subsequently, the specific gravity, compression set, tear strength, Asker C hardness, impact resilience and gel fraction of the secondary crosslinked foam were determined according to the above-described methods. The results are shown in Table 1.

Comparative Example 1

Comparative example 1 was carried out in the same manner as Example 1 with the only exception that zinc acrylate was not used therein. The results are shown in Table 1.

TABLE 1

|  |  | Example 1 | Example 2 | Example 3 | Comparative example 1 |
|---|---|---|---|---|---|
| Composition of elastomeric composition |  |  |  |  |  |
|  | [part by weight] |  |  |  |  |
| Copolymer (A1) |  | 25 | — | 18.8 | 25 |
| Copolymer (A2) |  | — | 25 | — | — |
| Copolymer (A3) |  | 45 | — | 50 | 45 |
| Copolymer (A4) |  | — | 45 | — | — |
| Copolymer (A6) |  | 30 | 30 | 31.2 | 30 |
| HPLDPE |  | — | — | 25 | — |
| Zinc oxide |  | 3 | 3 | 3 | 3 |
| Stearic acid |  | 1 | 1 | 1 | 1 |
| Titanium white |  | 4 | 4 | 4 | 4 |
| Dicumyl peroxide |  | 0.6 | 0.6 | 0.6 | 0.6 |
| Triallyl cyanurate |  | 0.15 | 0.15 | 0.15 | 0.15 |
| Azodicarbonamide |  | 7.0 | 7.0 | 7.0 | 7.0 |
| Zinc acrylate |  | 0.4 | 0.4 | 0.4 | — |
| Properties of the secondary crosslinked foam |  |  |  |  |  |
| Specific gravity | [g/cm$^3$] | 0.13 | 0.13 | 0.14 | 0.13 |
| Gel fraction | [%] | 86 | 84 | 84 | 78 |
| Asker C hardness |  | 55 | 57 | 61 | 55 |
| Tear strength | [kg/cm] | 3.1 | 3.0 | 3.3 | 2.7 |
| Compression set | [%] | 38 | 40 | 37 | 43 |
| Impact resilience | [%] | 65 | 65 | 62 | 62 |

Example 3

18.8 parts by weight of the above ethylene/1-butene copolymer (A1), 50 parts by weight of the above ethylene/1-butene copolymer (A3), 31.2 parts by weight of the above ethylene/1-hexene copolymers (A6), 25 parts by weight of the above high pressure low density polyethylene [HPLDPE; density (ASTM D 1505=920 kg/m$^3$, MFR (ASTM D 1238, 190° C., 2.16 kg load)=3.0 g/10 min], 3 parts by weight of zinc oxide, 1 part by weight of stearic acid, 4 parts by weight of titanium white, 0.6 parts by weight of dicumyl peroxide, 0.15 parts by weight of triallyl cyanurate, 7.0 parts by weight of azodicarbonamide and 0.4 parts by weight of zinc acrylate were mixed and kneaded for 10 minutes with twin rolls having a roll surface temperature of 120° C., and the mixture was then molded into a sheet shape.

The obtained sheet was filled in a press mold, and then was pressurized and heated under conditions of 150 kg/cm$^2$, 155° C. and 30 minutes to obtain the primary crosslinked foam. The size of the press mold was 15 mm in thickness, 150 mm in length and 200 mm in width.

Example 4

33.3 parts by weight of the above ethylene/1-butene copolymer (A3), 66.7 parts by weight of the above ethylene/1-hexene copolymer (A6), 122 parts by weight of ethylene/vinyl acetate copolymer [EVA; vinyl acetate content=21% by weight, MFR (ASTM D 1238, 190° C., 2.16 kg load)=1.5 g/10 min], 3 parts by weight of zinc oxide, 1 part by weight of stearic acid, 4 parts by weight of titanium white, 0.6 parts by weight of dicumyl peroxide, 0.15 parts by weight of triallyl cyanurate, 6.5 parts by weight of azodicarbonamide and 0.4 parts by weight of zinc acrylate were mixed and kneaded for 10 minutes with twin rolls having a roll surface temperature of 120° C., and the mixture was then molded into a sheet shape.

The obtained sheet was filled in a press mold, and then was pressurized and heated under conditions of 150 kg/cm$^2$, 155° C. and 30 minutes to obtain the primary crosslinked foam. The size of the press mold was 15 mm in thickness, 150 mm in length and 200 mm in width.

Then, the primary crosslinked foam was compression molded under conditions of 155° C., 150 kg/cm$^2$ and 10 minutes to obtain the secondary crosslinked foam. The size of the thus obtained secondary crosslinked foam was 15 mm in thickness, 160 mm in length and 250 mm in width.

Subsequently, the specific gravity, compression set, tear strength, Asker C hardness, impact resilience and gel fraction of the secondary crosslinked foam were determined according to the above-described methods. The results are shown in Table 2.

Example 5

Example 5 was carried out in the same manner as Example 4 with the only exception that 66.7 parts by weight of ethylene/1-butene copolymer (A5) was used instead of 66.7 parts by weight of ethylene/1-hexene copolymer (A6). The results are shown in Table 2.

Comparative Example 2

Comparative example 2 was carried out in the same manner as Example 4 with the only exception that zinc acrylate was not used therein. The results are shown in Table 2.

Comparative Example 3

Comparative example 3 was carried out in the same manner as Example 5 with the only exception that zinc acrylate was not used therein. The results are shown in Table 2.

table, and having at least two groups containing unsaturated carbon bond and at least one atom selected from oxygen, sulfur and nitrogen per one molecule.

2. The elastomeric composition according to claim 1 further comprising, based on 100 parts by weight of said ethylene/α-olefin copolymer (A), 5 to 100 parts by weight of a high pressure low density polyethylene (B) having a melt flow rate (ASTM D 1238, 190° C., 2.16 kg load) of 0.1 to 50 g/10 min, and/or 5 to 1,900 parts by weight of an ethylene/vinyl acetate copolymer (C) having a vinyl acetate content of 10 to 30% by weight and a melt flow rate (ASTM D 1238, 190° C., 2.16 kg load) of 0.1 to 50 g/10 min.

3. The elastomeric composition according to claim 1 or 2, wherein the α-olefin in said ethylene/α-olefin copolymer (A) is an α-olefin containing 3 to 10 carbon atoms.

4. The elastomeric composition according to claim 1, wherein there is used, as said ethylene/α-olefin copolymer (A), a mixture of two or more ethylene/α-olefin copolymers, having a molecular weight distribution (Mw/Mn) determined by gel permeation chromatography (GPC) within a range of 1.5 to 4, and a ratio ($MFR_{10}/MFR_{2.16}$) of a melt flow rate (ASTM D 1238, 190° C., 2.16 kg load), $MFR_{2.16}$ to a melt flow rate (ASTM D 1238, 190° C., 10 kg load), $MFR_{10}$ within a range of 5 to 20.

5. The elastomeric composition according to claim 4, wherein said mixture of two or more of the ethylene/α-olefin copolymers is produced by blending or multistage polymerization so that it has a molecular weight distribution (Mw/Mn) determined by GPC within a range of 2.3 to 6.

TABLE 2

|  |  | Example 4 | Example 5 | Comparative example 2 | Comparative example 3 |
|---|---|---|---|---|---|
| Composition of elastomeric composition |  |  |  |  |  |
|  | [part by weight] |  |  |  |  |
| Copolymer (A3) |  | 33.3 | 33.3 | 33.3 | 33.3 |
| Copolymer (A5) |  | — | 66.7 | — | 66.7 |
| Copolymer (A6) |  | 66.7 | — | 66.7 | — |
| EVA |  | 122 | 122 | 122 | 122 |
| Zinc oxide |  | 3 | 3 | 3 | 3 |
| Stearic acid |  | 1 | 1 | 1 | 1 |
| Titanium white |  | 4 | 4 | 4 | 4 |
| Dicumyl peroxide |  | 0.6 | 0.6 | 0.6 | 0.6 |
| Triallyl cyanurate |  | 0.15 | 0.15 | 0.15 | 0.15 |
| Azodicarbonamide |  | 6.5 | 6.5 | 6.5 | 6.5 |
| Zinc acrylate |  | 0.4 | 0.4 | — | — |
| Properties of the secondary crosslinked foam |  |  |  |  |  |
| Specific gravity | [g/cm³] | 0.14 | 0.14 | 0.14 | 0.14 |
| Gel fraction | [%] | 85 | 86 | 79 | 80 |
| Asker C hardness |  | 54 | 55 | 55 | 55 |
| Tear strength | [kg/cm] | 3.0 | 3.0 | 2.6 | 2.6 |
| Compression set | [%] | 43 | 43 | 47 | 47 |
| Impact resilience | [%] | 62 | 61 | 56 | 57 |

What is claimed is:

1. An elastomeric composition for preparing an olefinic elastomer crosslinked foam, comprising:
   an ethylene/α-olefin copolymer (A) which has a density (ASTM D 1505) of 880 to 920 kg/m³, and a melt flow rate (ASTM D 1238, 190° C., 2.16 kg load), $MFR_{2.16}$, of 0.1 to 10 g/10 min;
   an organic peroxide (D);
   a crosslinking assistant (E);
   a foaming agent (F); and
   an organic metal compound (G) which is a compound of metal selected from Groups 2 to 12 of the periodic 6. The elastomeric composition according to claim 1, wherein said organic metal compound (G) has at least two $CH_2=CH-CO-O-$ or $CH_2=C(CH_3)-CO-O-$ groups per molecule.

7. The elastomeric composition according to claim 6, wherein said organic metal compound (G) is an organic zinc compound.

8. The elastomeric composition according to claim 7, wherein said organic zinc compound is zinc diacrylate or zinc dimethacrylate.

9. The elastomeric composition according to claim 1, which contains 0.05 to 5 parts by weight of sad organic metal compound (G) based on 100 parts by weight of the total amount of the ethylene/α-olefin copolymer (A), the high pressure low density polyethylene (B) and the ethylene/vinyl acetate copolymer (C).

10. An olefinic elastomer crosslinked foam, which is obtained by crosslinking and foaming the elastomeric composition for preparing olefinic elastomer crosslinked foam according to claim 1.

11. An olefinic elastomer crosslinked foam, which is obtained by a secondary compression of the crosslinked foam according to claim 10.

12. The olefinic elastomer crosslinked foam according to claim 11, wherein said secondary compression is performed under conditions of a temperature of 130° C. to 200° C. and a load of 30 to 300 kgf/cm$^2$ for 5 to 60 minutes.

13. The olefinic elastomer crosslinked foam according to any one of claims 10 to 12 having a specific gravity (JIS K 7222) of 0.05 to 0.25, a surface hardness (Asker C hardness) of 20 to 80, and a gel fraction of 70% or more.

14. A footwear part, which is made of the crosslinked foam according to claim 10.

15. The footwear part according to claim 14, which is a midsole, innersole or sole.

16. An elastomeric composition for preparing an olefinic elastomer crosslinked foam, comprising:

an ethylene/α-olefin copolymer (A) which contains a unit derived from ethylene in an amount of 85 to 99 mole % and a unit derived from an α-olefin in an amount of 1 to 15 mole %, and has a melt flow rate (ASTM D 1238, 190° C., 2.16 kg load), MFR$_{2.16}$, of 0.1 to 10 g/10 min;

an organic peroxide (D);

a crosslinking assistant (E);

a foaming agent (F); and an organic metal compound (G) which is a compound of metal selected from Groups 2 to 12 of the periodic table, and having at least two groups containing unsaturated carbon bond and at least one atom selected from oxygen, sulfur and nitrogen per one molecule.

17. The elastomeric composition according to claim 16 further comprising, based on 100 parts by weight of said ethylene/α-olefin copolymer (A), 5 to 100 parts by weights of a high pressure low density polyethylene (B) having a melt flow rate (ASTM D 1238, 190° C., 2.16 kg load) of 0.1 to 50 g/10 min, and/or 5 to 1,900 parts by weight of an ethylene/vinyl acetate copolymer (C) having a vinyl acetate content of 10 to 30% by weight and a melt flow rate (ASTM D 1238, 190° C., 2.16 kg load) of 0.1 to 50 g/10 min.

18. The elastomeric composition according to claim 16 or 17, wherein the α-olefin copolymer (A) is an α-olefin containing 3 to 10 carbon atoms.

19. The elastomeric composition according to claim 16, wherein there is used, as said ethylene/α-olefin copolymer (A), a mixture of two or more ethylene/α-olefin copolymers, having a molecular weight distribution (Mw/Mn) determined by gel permeation chromatography (GPC) within a range of 1.5 to 4, and a ratio (MFR$_{10}$/MFR$_{2.16}$) of a melt flow rate (ASTM D 1238, 190° C., 2.16 kg load), MFR$_{2.16}$ to a melt flow rate (ASTM D 1238, 190° C., 10 kg load), MFR$_{10}$ within a range of 5 to 20.

20. The elastomeric composition according to claim 19, wherein said mixture of two or more of the ethylene/α-olefin copolymers is produced by blending or multistage polymerization so that it has a molecular weight distribution (Mw/Mn) determined by GPC within a range of 2.3. to 6.

21. The elastomeric composition according to claim 16, wherein said organic metal compound (G) has at least two CH$_2$=CH—CO—O— or CH$_2$=C(CH$_3$)—CO—O— groups per molecule.

22. The elastomeric composition according to claim 21, wherein said organic metal compound (G) is an organic zinc compound.

23. The elastomeric composition according to claim 22, wherein said organic zinc compound is zinc diacrylate or zinc dimethacrylate.

24. The elastomeric composition according to claim 16, which contains 0.05 to 5 parts by weight of said organic metal compound (G) based on 100 parts by weight of the total amount of the ethylene/α-olefin copolymer (A), the high pressure low density polyethylene (B) and the ethylene/vinyl acetate copolymer (C).

25. An olefinic elastomer crosslinked foam, which is obtained by crosslinking and foaming the elastomeric composition for preparing olefinic elastomer crosslinked foam according to claim 16.

26. An olefinic elastomer crosslinked foam, which is obtained by a secondary compression of the crosslinked foam according to claim 25.

27. The olefinic elastomer crosslinked foam according to claim 26, wherein said secondary compression is performed under conditions of a temperature of 130° C. to 200° C. and a load of 30 to 300 kgf/cm$^2$ for 5 to 60 minutes.

28. The olefinic elastomer crosslinked foam according to any one of claims 25 to 27 having a specific gravity (JIS K 7222) of 0.05 to 0.25, a surface hardness (Asker C hardness) of 20 to 80, and a gel fraction of 70% or more.

29. A footwear part, which is made of the crosslinked foam according to claim 25.

30. The footwear part according to claim 29, which is a midsole, innersole or sole.

* * * * *